(12) United States Patent
Sugaya

(10) Patent No.: US 10,789,914 B2
(45) Date of Patent: Sep. 29, 2020

(54) COMPUTER SYSTEM, SCREEN SHARING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/578,794

(22) PCT Filed: Mar. 30, 2017

(86) PCT No.: PCT/JP2017/013255
§ 371 (c)(1),
(2) Date: Dec. 1, 2017

(87) PCT Pub. No.: WO2018/179222
PCT Pub. Date: Oct. 4, 2018

(65) Prior Publication Data
US 2020/0013373 A1    Jan. 9, 2020

(51) Int. Cl.
G09G 5/37    (2006.01)
G06F 3/14    (2006.01)
G06F 21/84    (2013.01)

(52) U.S. Cl.
CPC .............. *G09G 5/37* (2013.01); *G06F 3/1454* (2013.01); *G06F 21/84* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 9,691,361 | B2* | 6/2017 | Basson | ............ G09G 5/37 |
| 10,325,103 | B1* | 6/2019 | Austin | ............ G06F 3/04883 |
| 2008/0002911 | A1* | 1/2008 | Eisen | ............ G06F 21/6245 |
| | | | | 382/283 |
| 2014/0327634 | A1* | 11/2014 | Kim | ............ G06F 21/50 |
| | | | | 345/173 |

(Continued)

FOREIGN PATENT DOCUMENTS

JP  62-206681  9/1987
JP  2002-010063  1/2002

(Continued)

OTHER PUBLICATIONS

JP 2002-010063 A; English Machine Translation from JPO website. Masahiro et. al. (Year: 2002).*

(Continued)

*Primary Examiner* — Edward Martello
(74) *Attorney, Agent, or Firm* — Lex IP Meister, PLLC (57) ABSTRACT

A computer system receives an input of a predetermined area within a screen which is screen-shared, and performs a mosaic process so as to cause a sharing destination not to visually recognize either the predetermined area or an area within the screen other than the predetermined area. The computer system extracts and stores a character or an image of a part on which the mosaic process is performed by receiving the input, and performs, when it is displayed on the screen, the mosaic process on it in addition to either the predetermined area or an area within the screen other than the predetermined area.

3 Claims, 7 Drawing Sheets

(56) References Cited

U.S. PATENT DOCUMENTS

| | | | | |
|---|---|---|---|---|
| 2015/0046834 A1* | 2/2015 | Wu | .......................... | H04L 51/04 |
| | | | | 715/748 |
| 2015/0217189 A1* | 8/2015 | Ninjouji | ................ | A63F 13/213 |
| | | | | 463/31 |
| 2018/0060016 A1* | 3/2018 | Koda | ...................... | G06F 21/00 |

FOREIGN PATENT DOCUMENTS

| | | |
|---|---|---|
| JP | 2006-195668 | 7/2006 |
| JP | 5216810 | 12/2011 |
| JP | 2013-242782 | 12/2013 |
| JP | 2015-143899 | 8/2015 |
| JP | 2015-184827 | 10/2015 |

OTHER PUBLICATIONS

JP 2011-248761 A; English Machine Translation from JPO website. Masaya et. al. (Year: 2011).*

JP 62-206681 A; English Machine Translation from JPO website. Minoru (Year: 1987).*

* cited by examiner

COMPUTER SYSTEM, SCREEN SHARING METHOD, AND PROGRAM

TECHNICAL FIELD

The present invention relates to a computer system, a screen sharing method, and a program that perform screen sharing.

BACKGROUND ART

In recent years, along with widespread use of wearable terminals such as smart glasses, sharing camera images captured by imaging devices owned by the wearable terminals is increasing. When sharing such camera images, securing privacy is a problem. That is, when screen sharing is performed by wearable terminals, mobile terminals, or the like, a thing different from a target object is reflected in the camera image such that it is often that privacy cannot be protected.

Therefore, for the purpose of protecting privacy, for example, a technique in which screen sharing is not performed only for a predetermined specified window is disclosed (see Patent Document 1).

PRIOR ART DOCUMENT

Patent Document

Patent Document 1: Japanese Patent No. 5216810

SUMMARY OF THE INVENTION

Technical Problem

However, in the configuration of Patent Document 1, when a camera image captured by an image device is shared, there is no frame such as a window screen. For this reason, for example, confidential information or the like which has been reflected in the camera image but is not intended for sharing may be screen-shared. Therefore, privacy protection is not sufficient.

It is an object of the present invention to provide a computer system, a screen sharing method, and a program capable of protecting privacy.

Technical Solution

The present invention provides the following solutions.

The present invention provides a computer system including an area receiving unit that receives an input of a predetermined area within a screen which is screen-shared, and a mosaic processing unit that performs a mosaic process so as to cause a sharing destination not to visually recognize either the predetermined area or an area within the screen other than the predetermined area.

According to the present invention, a computer system receives an input of a predetermined area within a screen which is screen-shared, and performs a mosaic process so as to cause a sharing destination not to visually recognize either the predetermined area or an area within the screen other than the predetermined area.

The present invention relates to a computer system, but exhibits the same operations and effects even when being applied to other categories such as an screen sharing method, a program, and the like.

Effects of the Invention

According to the present invention, it is possible to provide a computer system, a screen sharing method, and a program capable of protecting privacy.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

[Overview of Screen Sharing System 1]

Figure 1:
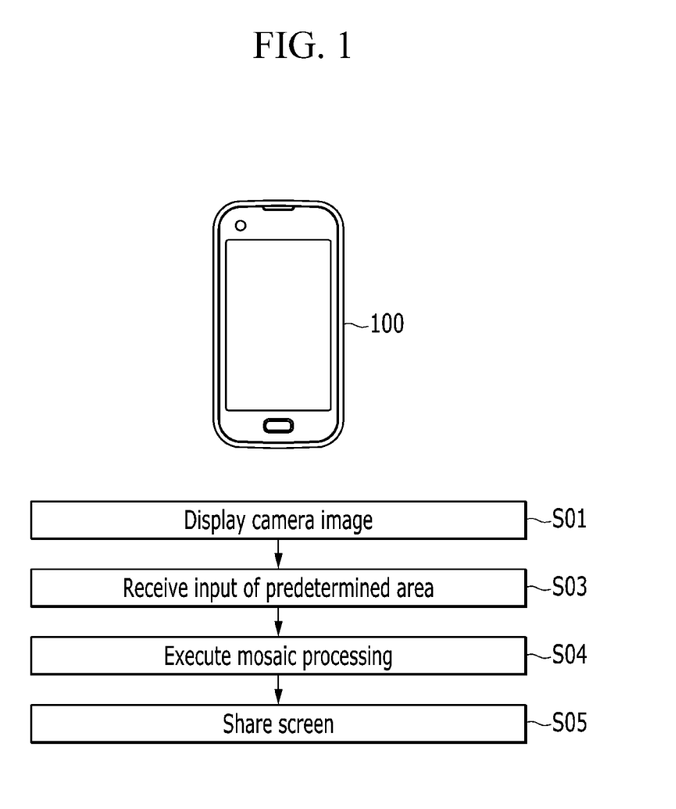
FIG. 1 is a diagram showing overview of a screen sharing system 1.

An overview of an embodiment of the present invention is described with reference to FIG. 1. FIG. 1 is a diagram for explaining an overview of a screen sharing system 1 which is an embodiment of the present invention. The screen sharing system 1 includes a mobile terminal 100, and is a computer system that shares a screen with other mobile terminals or the like (not shown).

In FIG. 1, the number of mobile terminal(s) 100 may be changed as appropriate. Further, the mobile terminal 100 is not limited to an existing device, but may be a virtual device.

The mobile terminal 100 is a terminal device capable of performing data communication. The mobile terminal 100 is a terminal device capable of sharing a camera image captured by an imaging device such as a camera owned by the mobile terminal 100 with other terminal devices. The mobile terminal 100 is an electric appliance such as a mobile phone, a portable information terminal, a tablet terminal, a personal computer, a netbook terminal, a slate terminal, an electronic dictionary terminal, a portable music player, or the like, a wearable terminal such as smart glasses, a head mounted display, or the like, or other goods.

The mobile terminal 100 captures a camera image such as a moving image or a still image by the imaging device owned by the mobile terminal 100, and displays the camera image on the mobile terminal 100 (step S01).

The mobile terminal 100 receives an input of a predetermined area within a screen to be screen-shared (step S03). The input of the predetermined area is, for example, an input for enclosing an area desired by the user, or an input for specifying the area itself (for example, an input for specifying an object, a person, a character, or the like reflected in the camera image).

The mobile terminal 100 executes a mosaic process so as to cause a sharing destination not to visually recognize either the received predetermined area or an area within the screen other than the predetermined area (step S04). This mosaic process is, for example, a process of causing the screen sharing destination not to visually recognize a target area, such as lowering the resolution of the target area or painting the whole of the target area, or a processing of enlarging an original image on which the mosaic process is not performed. The processing of enlarging the original image is to increase the image size while maintaining an aspect ratio of the received predetermined area or the area within the screen other than the predetermined area.

The mobile terminal 100 shares the displayed camera image with another terminal device (not shown) (step S05).

In the screen sharing system 1, for example, characters or images to be subjected to the mosaic process to be described below are previously registered in the mobile terminal 100 or the terminal device of the screen sharing destination, and an image analysis is performed on the displayed camera image or the screen-shared camera image. The screen sharing system 1 determines whether this character or image is reflected as a result of the image analysis. The mosaic process may be performed on this character or the image itself if the character or image is reflected. Characters or numbers themselves as well as various vocabulary, phrases, or sentences may be registered as the characters. In addition, an image itself or a character indicating the image may be registered as the image. When the character indicating the image is registered, the image corresponding to this character is discriminated from the camera image and then the mosaic process is performed.

The above is the overview of the screen sharing system 1.

[System Configuration of Screen Sharing System 1]

Figure 2:
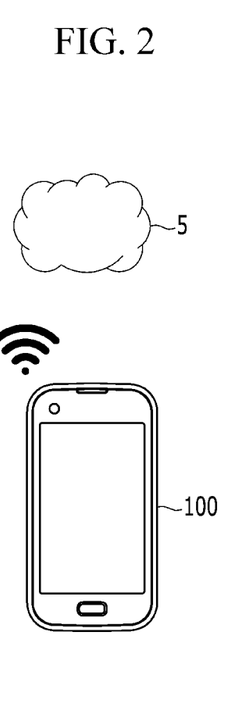
FIG. 2 is a diagram showing a system configuration of a screen sharing system 1.

A system configuration of a screen sharing system 1 which is an embodiment of the present invention is described with reference to FIG. 2. FIG. 2 is a diagram showing a system configuration of a screen sharing system 1 which is an embodiment of the present invention. The screen sharing system 1 is a computer system including a mobile terminal 100 and a public line network 5 (an Internet network, a third or fourth generation communication network, or the like), and performs screen sharing with other terminal devices (not shown).

The number of device(s) constituting the screen sharing system 1 may be appropriately changed. Further, the screen sharing system 1 may be realized not only by existing devices but also by virtual devices.

The mobile terminal 100 is the terminal device having functions to be described below.

[Description of Each Function]

Figure 3:
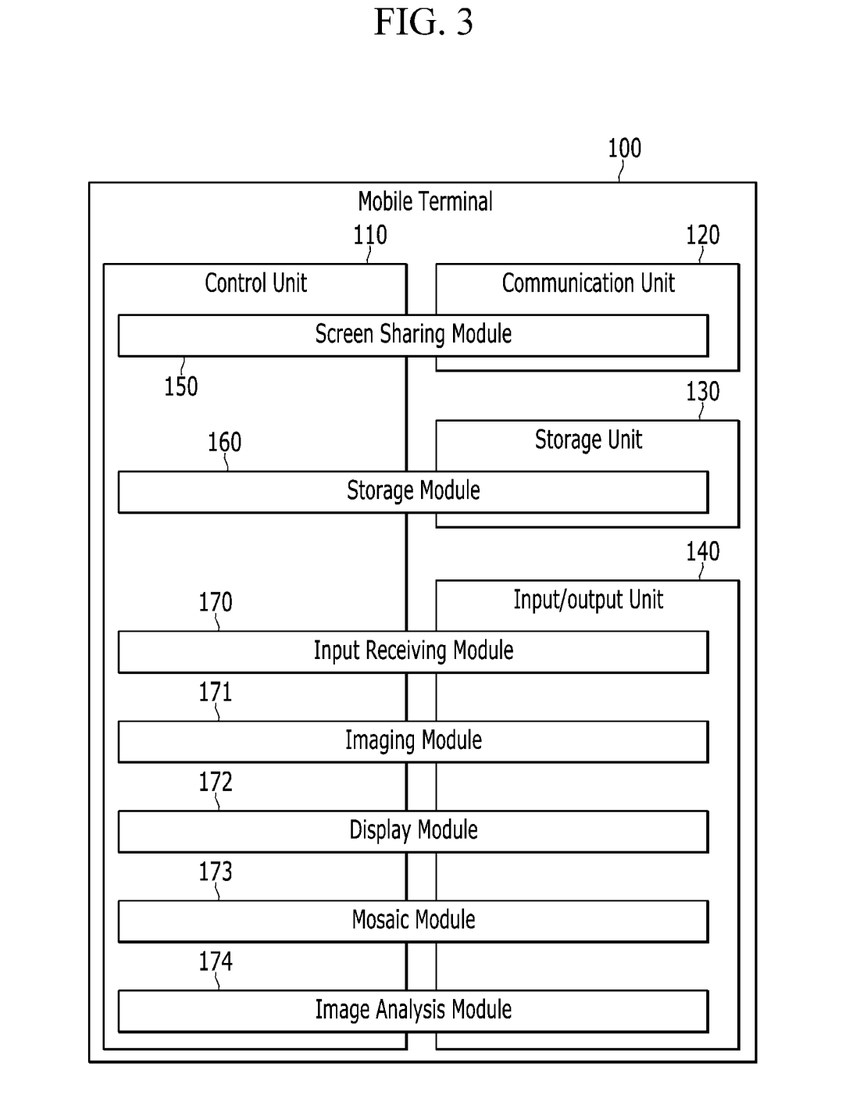
FIG. 3 is a functional block diagram of a mobile terminal 100.

Functions of a screen sharing system 1 which is an embodiment of the present invention are described with reference to FIG. 3. FIG. 3 is a functional block diagram of a mobile terminal 100.

The mobile terminal 100 includes, as a control unit 110, a CPU (Central Processing Unit), a RAM (Random Access Memory), a ROM (Read Only Memory), and the like. The mobile terminal 100 includes, as a communication unit 120, a device, for example a WiFi (Wireless Fidelity) compliant device conforming to IEEE 802.11 or the like, for enabling communication with another terminal device or the like. In addition, the mobile terminal 100 includes, as a storage unit 130, a data storage device such as a hard disk, a semiconductor memory, a recording medium, a memory card, or the like. The mobile terminal 100 includes, as an input/output unit 140, a display unit for outputting and displaying data and images controlled by the control unit 110, an input unit such as a touch panel, a keyboard, or a mouse, for receiving an input from the user, and various devices such as an imaging device for capturing an image such as a moving image or a still image.

In the mobile terminal 100, the control unit 110 reads a predetermined program, thereby realizing a screen sharing module 150 in cooperation with the communication unit 120. In addition, in the mobile terminal 100, the control unit 110 reads a predetermined program, thereby realizing a storage module 160 in cooperation with the storage unit 130. Further, in the mobile terminal 100, the control unit 110 reads a predetermined program, thereby realizing an input receiving module 170, an imaging module 171, a display module 172, a mosaic module 173, and an image analysis module 174, in cooperation with the input/output unit 140.

[Mosaic Target Storing Processing]

Figure 4:
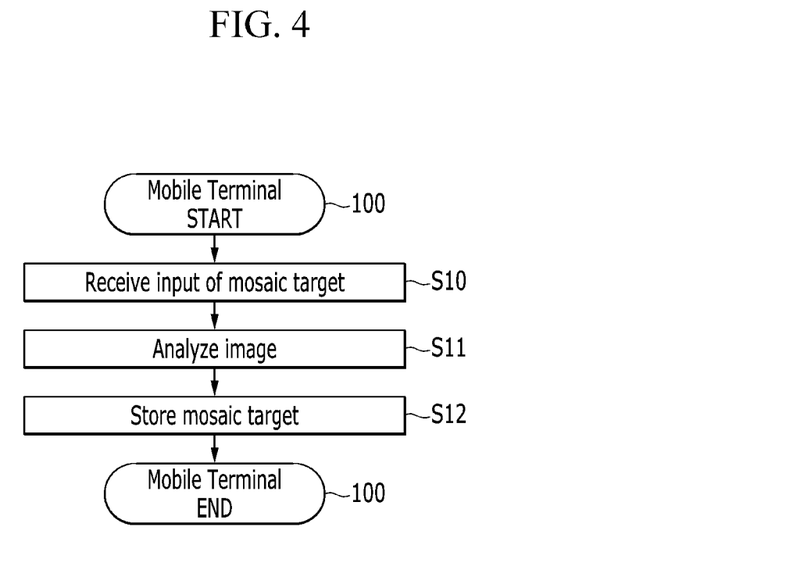
FIG. 4 is a diagram showing a flowchart of a mosaic target storing processing executed by a mobile terminal 100.

A mosaic target storing processing executed by a screen sharing system 1 is described with reference to FIG. 4. FIG. 4 is a diagram showing a flowchart of a mosaic target storing processing executed by a mobile terminal 100. The processing executed by each module described above is described together with the present processing.

An input receiving module 170 receives an input of a mosaic target indicating a character or an image to be subjected to a mosaic process to be described below (step S10). In step S10, the input receiving module 170 receives the input of a specific vocabulary, word, sentence, character itself, number, symbol, or the like. Further, the input receiving module 170 receives an input of a camera image which is captured or has been already captured by an imaging module 171 as an image to be subjected to the mosaic process. At this time, the input receiving module 170 may receive the camera image itself as the input, or may receive an input to a specific subject included in the camera image.

Further, the input receiving module 170 may receive an input of information capable of identifying the image other than the image itself such as the feature of the image or the like.

An image analysis module 174 performs an image analysis on the camera image (step S11). In step S11, the image analysis module 174 performs the image analysis by extracting a feature point or a feature amount of the camera image. The image analysis module 174 extracts a character or an image which is a subject reflected in the camera image, based on the extracted feature point or feature amount.

A storage module 160 stores the mosaic target extracted by the image analysis module 174 (step S12). The mobile terminal 100 uses the stored mosaic target in the processing to be described below.

In addition, the mosaic target storing processing may be executed not only by the mobile terminal 100 but also by a terminal device that performs screen sharing with this mobile terminal 100. In this case, the terminal device itself may execute the above-described processing. Further, the terminal device may acquire and store the mosaic target stored by the mobile terminal 100. Furthermore, the terminal device may acquire and store the mosaic target from a device other than the mobile terminal 100.

The above is the mosaic target storing processing.

[Mosaic Specifying Processing]

Figure 5:
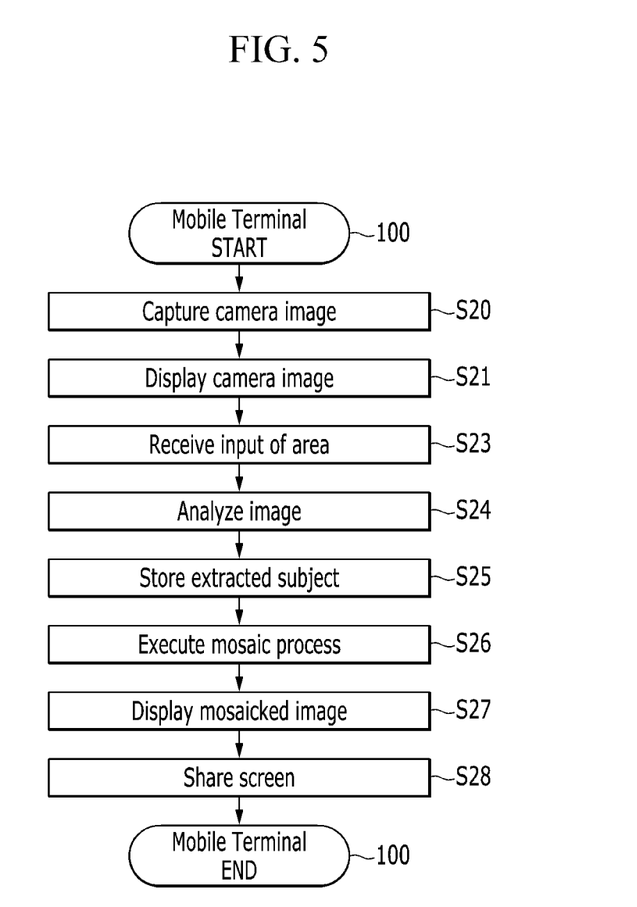
FIG. 5 is a flowchart showing a mosaic specifying processing executed by a mobile terminal 100.

A mosaic specifying processing executed by a screen sharing system 1 is described with reference to FIG. 5. FIG. 5 is a flowchart showing a mosaic specifying processing executed by a mobile terminal 100. The processing executed by each module described above is described together with the present processing.

First, an imaging module 171 captures a camera image (step S20). In step S20, the imaging module 171 captures a moving image or a still image as the camera image.

A display module 172 displays the camera image captured by the imaging module 171 (step S21).

The input receiving module 170 receives an input of a predetermined area of the screen to be screen-shared (step S23). In step S23, the input receiving module 170 inputs the predetermined area by a tap input, a gesture input, a mouse input, a voice input, or the like. At this time, the display module 170 may display a delimiting line that separates the area on which the input is received from the other areas. By enclosing the area as a predetermined input, the enclosed area is input as the predetermined area. In addition, the predetermined input may be received by a method other than the enclosing method, or may be an input of specifying an object, a person, a character, or the like shown on the screen. In the following description, it is assumed that the input of enclosing the area is received as the predetermined input and a mosaic process is performed on the enclosed area.

Although it will be described in detail later, the mosaic process may be performed on an area other than the enclosed area. Further, the input of the predetermined area may be performed not only by the mobile terminal 100 but also by the terminal device of a sharing destination. Furthermore, the process of step S23 may be performed between the process of step S21 and the process of step S22.

An image analysis module 174 performs an image analysis on the camera image in the enclosed area (step S24). In step S24, the image analysis module 174 performs the image analysis by extracting a feature point or a feature amount of the camera image. The image analysis module 174 extracts a character or an image which is a subject reflected in the camera image based on the extracted feature point or feature amount.

The storage module 160 stores the subject extracted as an extracted subject (step S25).

In addition, the processes of step S24 and step S25 may be omitted. In this case, a process of step S26 to be described later may be executed subsequently to the process of step S23. Further, the processes of step S24 and step S25 may be performed after the process of step S26 to be described later. That is, the mobile terminal 100 may extract the character or image of a portion on which the mosaic process has been performed and store the extracted character or image.

A mosaic module 173 executes the mosaic process so as to cause the sharing destination not to visually recognize the enclosed area (step S26). In step S26, the mosaic process performed by the mosaic module 173 is performed, for example, by blurring the enclosed area in pixel units, by painting an entire area with a representative value of the enclosed area, by reading color information of the enclosed area to calculate an average value and performing an image processing based on the calculated result, or by lowering a resolution of the enclosed area. This mosaic process is irreversible conversion. In the present embodiment, the mosaic process is referred to as a process of reducing the number of pixels in the enclosing area by the mosaic module 173. That is, the mosaic module 173 enlarges the pixels of the image of the enclosed area so as to cause the sharing destination not to visually recognize it.

By doing so, when the mobile terminal 100 and the terminal device shares the screen, it is possible to reduce the amount of communication for the screen sharing, and it is expected that the communication speed at the time of the screen sharing is improved. In addition, compared to a case where the screen is shared by painting the enclosed area, especially when the camera image is a moving image, the camera image can be more naturally displayed and it is possible to eliminate the color incompatibility between the portion on which the mosaic process is performed and a portion on which the mosaic process is not performed.

A display module 172 displays the mosaicked image which is the camera image on which the mosaic process has been performed (step S27).

A screen sharing module 150 shares a screen of the mosaicked image with the terminal device which is not shown (step S28). In step S28, the terminal device acquires the mosaicked image displayed by the mobile terminal 100 and displays the mosaicked image on the terminal device, thereby sharing the screen.

Further, the computer system 1 may temporarily stop the screen sharing when receiving the input of the predetermined area in the process of step S23. In this case, a notification screen indicating that confidential information is included is shared with the terminal device of the sharing destination, instead of the camera image. Then, the computer system 1 may execute the screen sharing of the mosaicked image when the mosaicked image is displayed.

While the mosaic process is performed on the enclosing area in the present embodiment, the mosaic process may be performed on an area other than the enclosing area instead of the enclosing area. In this case, the image analysis module 174 may perform the image analysis on the area other than the enclosing area instead of the enclosing area, and may perform the image analysis on the camera image in this area. Further, the mosaic module 173 may perform the mosaic process on this area. That is, the mosaic module 173 performs the mosaic process on either the predetermined area on which the input is received or the area other than the predetermined area.

The above is the mosaic specifying processing.

[Extracted Subject Mosaic Processing]

Figure 6:
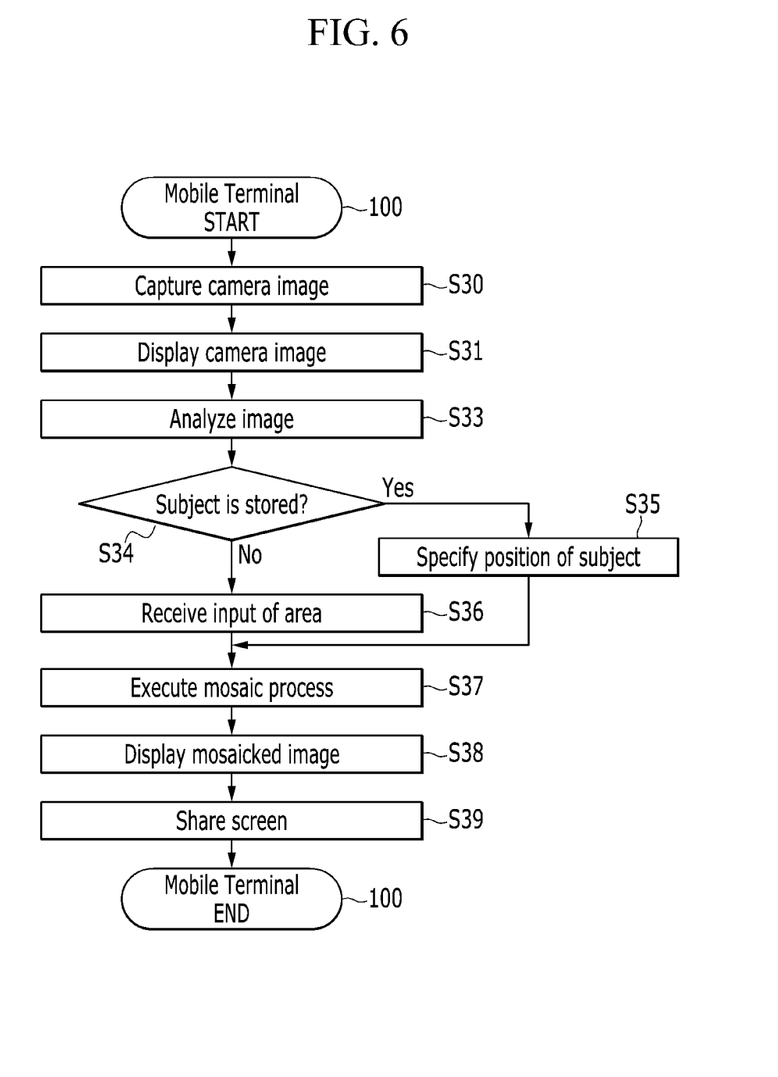
FIG. 6 is a diagram showing a flowchart of an extracted subject mosaic processing executed by a mobile terminal 100.

An extracted subject mosaic processing executed by a screen sharing system 1 is described with reference to FIG. 6. FIG. 6 is a diagram showing a flowchart of an extracted subject mosaic processing executed by a mobile terminal 100. The processing executed by each module described above is described together with the present processing.

First, an imaging module 171 captures a camera image (step S30). The process of step S30 is the same as the process of step S20 described above.

A display module 172 displays the camera image captured by the imaging module 171 (step S31). The process of step S31 is the same as the process of step S21 described above.

An image analysis module 174 executes an image analysis of the camera image (step S33). The process of step S33 is substantially the same as the process of step S24 described above, but the difference is that the process of step S24 is to perform the image analysis on the camera image in the enclosed area, whereas the process of step S33 is perform the image analysis on the entire camera image.

The image analysis module 174 determines whether the subject extracted is stored as an extracted subject (step S34). In step S34, the image analysis module 174 determines whether the extracted subject stored in the storage module 160 by the process of step S25 described above matches with the subject extracted this time.

In step S34, when the image analysis module 174 determines that the extracted subject is stored (YES in step S34), the image analysis module 174 specifies a position of the corresponding subject on the screen (step S35). In step S35, the image analysis module 174 specifies, as the position on the screen, a position where the corresponding subject has been extracted.

On the other hand, when the image analysis module 174 determines, in step S34, that the extracted subject is not stored (NO in step S34), an input receiving module 170 receives an input of a predetermined area of the screen to be screen-shared (step S36). The process of step S36 is the same as the process of step S23 described above.

A mosaic module 173 executes a mosaic process on the subject specified by the above-described process of step S35 in addition to the enclosed area (step S37). The process of step S37 is the same as the process of step S26 described above. At this time, the mosaic module 173 performs the similar mosaic process on the specified subject.

In step S37, when the subject which is stored as the extracted subject does not exist in the screen, the mosaic module 173 executes the same process as the process of step S26 described above.

A display module 172 displays the mosaicked image which is the camera image on which the mosaic process has been performed (step S38). The process of step S38 is the same as the process of step S27 described above.

A screen sharing module 150 shares a screen of the mosaicked image with the terminal device which is not shown (step S39). The process of step S39 is the same as the process of step S28 described above.

Further, the computer system 1 may temporarily stop the screen sharing when receiving the input of the predetermined area in the process of step S36. In this case, a notification screen indicating that confidential information is included is shared with the terminal device of the sharing destination, instead of the camera image. Then, the computer system 1 may execute the screen sharing of the mosaicked image when the mosaicked image is displayed.

While the mosaic process is performed on the enclosing area in the present embodiment, the mosaic process may be performed on an area other than the enclosing area instead of the enclosing area. In this case, the mosaic module 173 may perform the mosaic process on a character or an image that has been subjected to mosaic process so far, in addition to the area other than the enclosed area instead of the enclosed area. That is, the mosaic module 173 executes the mosaic process on the character or image portion which has been subjected to the mosaic process so far, in addition to either the predetermined area on which the input is received or the area other than the predetermined area.

The above is the extracted subject mosaic processing.

[Mosaic Target Mosaic Processing]

Figure 7:
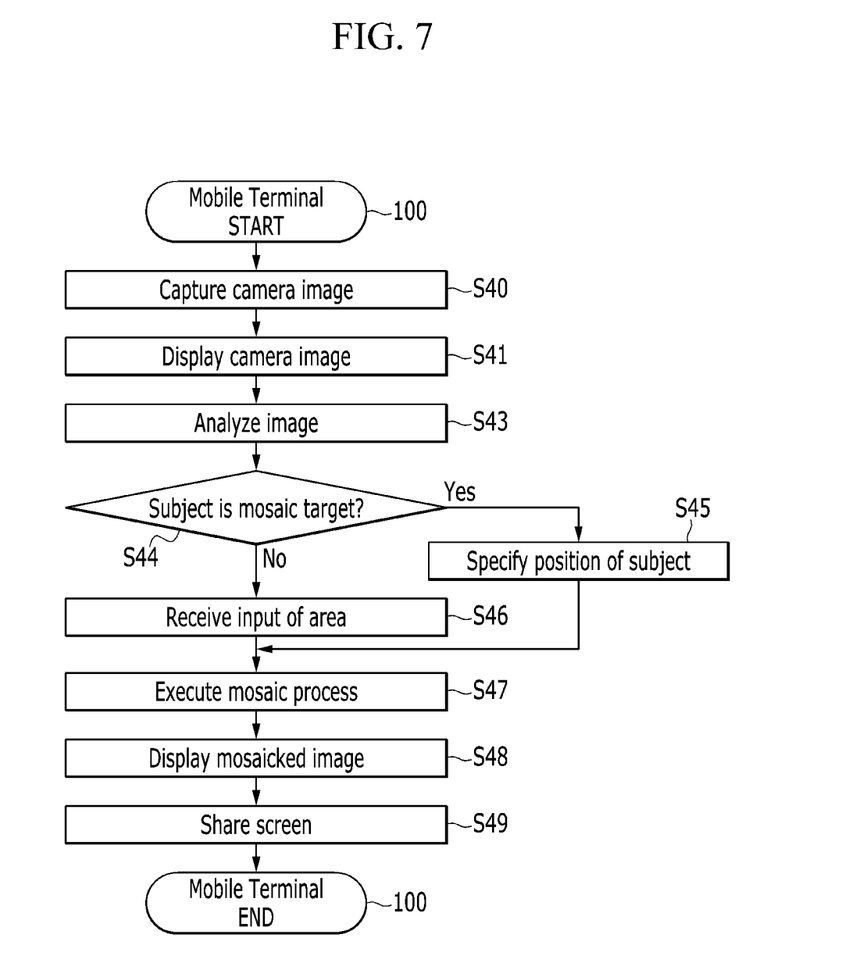
FIG. 7 is a flowchart showing a mosaic target mosaic processing executed by a mobile terminal 100.

A mosaic target mosaic processing executed by a screen sharing system 1 is described with reference to FIG. 7. FIG. 7 is a flowchart showing a mosaic target mosaic processing executed by a mobile terminal 100. The processing executed by each module described above will be described together with the present processing.

First, an imaging module 171 captures a camera image (step S40). The process of step S40 is the same as the process of step S20 described above.

A display module 172 displays the camera image captured by the imaging module 171 (step S41). The process of step S41 is the same as the process of step S21 described above.

An image analysis module 174 executes an image analysis of the camera image (step S43). The process of step S43 is the same as the process of step S33 described above.

The image analysis module 174 determines whether the subject extracted is stored as a mosaic target (step S44). In step S44, the image analysis module 174 determines whether the mosaic target stored in the storage module 160 by the process of step S11 matches with the subject extracted this time.

In step S44, when the image analysis module 174 determines that the extracted subject is stored as the mosaic target (YES in step S44), the image analysis module 174 specifies a position of the corresponding subject on the screen (step S45). In step S45, the image analysis module 174 specifies, as the position on the screen, a position where the corresponding subject has been extracted.

On the other hand, when the image analysis module 174 determines, in step S44, that the extracted subject is not stored as the mosaic target (NO in step S44), an input receiving module 170 receives an input of a predetermined area of the screen to be screen-shared (step S46). The process of step S46 is the same as the process of step S23 described above.

A mosaic module 173 executes a mosaic process on the subject specified by the above-described process of step S45 in addition to the enclosed area (step S47). The process of step S47 is the same as the process of step S26 described above. At this time, the mosaic module 173 performs the similar mosaic process on the specified subject.

In step S47, when the subject which is stored as the mosaic target does not exist in the screen, the mosaic module 173 executes the same process as the process of step S26 described above.

A display module 172 displays the mosaicked image which is the camera image on which the mosaic process has been performed (step S48). The process of step S48 is the same as the process of step S27 described above.

A screen sharing module 150 shares a screen of the mosaicked image with the terminal device which is not shown (step S49). The process of step S49 is the same as the process of step S28 described above.

Further, the computer system 1 may temporarily stop the screen sharing when receiving the input of the predetermined area in the process of step S46. In this case, a notification screen indicating that confidential information is included is shared with the terminal device of the sharing destination, instead of the camera image. Then, the computer system 1 may execute the screen sharing of this mosaicked image when the mosaicked image is displayed.

While the mosaic process is performed on the enclosing area in the present embodiment, the mosaic process may be performed on an area other than the enclosing area instead of the enclosing area. In this case, the mosaic module 173 may perform the mosaic process on a character or an image which is the mosaic target, in addition to the area other than the enclosing area instead of the enclosing area. That is, the mosaic module 173 performs the mosaic process on the displayed character or image portion which is previously stored as the target of the mosaic process, in addition to either the predetermined area on which the input is received or the area other than the predetermined area.

The computer system 1 may execute any one or a combination of two or more of the above-described mosaic specifying processing, the extracted subject mosaic processing, or the mosaic target mosaic processing. That is, in a case where the extracted subject stored in the mosaic specifying processing exists in the camera image when the mosaic target mosaic processing is executed, the computer system 1 may execute the mosaic process on the extracted subject in addition to the area on which the input is received and the mosaic target. Further, in a case where the mosaic target stored in the mosaic target storing processing exists in the camera image when the mosaic specifying processing is executed or the mosaic process is executed on the extracted subject, the computer system 1 may executing the mosaic process on the mosaic target in addition to the area on which the input is received and the extracted subject.

The means and functions described above are realized by reading and executing a predetermined program by a computer (including a CPU, an information processing device, and various terminals). The program is provided, for example, in a form (SaaS: software as a service) provided from the computer via a network. Further, the program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit to be stored and executed. Furthermore, the program may be recorded in advance in a storage device (recording medium) such as a magnetic disk, an optical disk, an optical magnetic disk, or the like and be provided from the recording medium to the computer through a communications line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: screen sharing system, 100: mobile terminal

What is claimed is:

1. A computer system comprising:
an area receiving unit that receives an input of a predetermined area within a screen which is to be configured for screen-sharing;
a mosaic processing unit that performs a mosaic process so as to cause a sharing destination not to visually recognize the predetermined area;
an extracting unit that extracts a first character or a first image of the predetermined area on which the mosaic process has been performed; and
a mosaic target storing unit that stores the extracted first character or first image,
wherein when a same character as the first character or a same image as the first image exists in a portion other than the predetermined area on which the mosaic process has been performed within the screen, the mosaic processing unit performs the mosaic process on the portion on which the same character or same image exists, in addition to the predetermined area.

2. The computer system according to claim 1, further comprising a mosaic target storing unit that previously stores a second character or a second image that is subjected to the mosaic process,
wherein when the second character or the second image exists within the screen, the mosaic processing unit performs the mosaic process on a portion on which the second character or second image exists, in addition to the predetermined area.

3. A computer system comprising:
an area receiving unit that receives an input of a first area within a screen which is to be configured for screen-sharing;
a mosaic processing unit that performs a mosaic process so as to cause a sharing destination not to visually recognize a second area other than the first area within the screen;
an extracting unit that extracts a first character or a first image of the second area on which the mosaic process has been performed; and
a mosaic target storing unit that stores the extracted first character or first image,
wherein when a same character as the first character or a same image as the first image exists in a portion other than the second area on which the mosaic process has been performed within the screen, the mosaic processing unit performs the mosaic process on the portion on which the same character or same image exists, in addition to the second area.

* * * * *